United States Patent
Chen et al.

(10) Patent No.: US 10,618,555 B2
(45) Date of Patent: Apr. 14, 2020

(54) SELF-LOCKING CAM WASHER

(71) Applicants: Song Chen, Troy, MI (US); Nathan Kellaway, Linden, MI (US); Matthew J O'Leary, Oxford, MI (US); Saravanan Ganeshmurthy, Auburn Hills, MI (US); Frederick J Zweng, Rochester Hills, MI (US)

(72) Inventors: Song Chen, Troy, MI (US); Nathan Kellaway, Linden, MI (US); Matthew J O'Leary, Oxford, MI (US); Saravanan Ganeshmurthy, Auburn Hills, MI (US); Frederick J Zweng, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 243 days.

(21) Appl. No.: 15/787,799

(22) Filed: Oct. 19, 2017

(65) Prior Publication Data

US 2019/0118862 A1    Apr. 25, 2019

(51) Int. Cl.
    *B62D 17/00*    (2006.01)
    *B60G 7/00*    (2006.01)
    *F16B 39/24*    (2006.01)

(52) U.S. Cl.
    CPC ............ *B62D 17/00* (2013.01); *B60G 7/001* (2013.01); *F16B 39/24* (2013.01); *B60G 2200/46* (2013.01); *B60G 2200/4622* (2013.01); *B60G 2204/43* (2013.01); *B60G 2400/0516* (2013.01)

(58) Field of Classification Search
    CPC ......... B62D 17/00; F16B 39/24; B60G 7/001; B60G 2204/43; B60G 2200/46; B60G 2200/4622; B60G 2400/0516
    See application file for complete search history.

(56) References Cited

U.S. PATENT DOCUMENTS

| | | | |
|---|---|---|---|
| 2,859,058 A | 11/1958 | Traugott | |
| 3,880,444 A | 4/1975 | Bridges | |
| 4,134,438 A * | 1/1979 | Frieberg | F16B 39/24 411/163 |
| 4,302,136 A | 11/1981 | Abe et al. | |
| 4,736,964 A | 4/1988 | Specktor | |
| 4,982,977 A | 1/1991 | Shimada | |
| 5,080,388 A | 1/1992 | Berry et al. | |
| 5,779,260 A * | 7/1998 | Reilly | B60G 15/07 280/86.754 |
| 6,966,735 B1 * | 11/2005 | Yamazaki | F16B 39/24 411/131 |
| 7,261,506 B2 * | 8/2007 | Smolarek | F16B 39/24 411/114 |
| 8,469,375 B2 | 6/2013 | Frens | |

(Continued)

*Primary Examiner* — James A English
(74) *Attorney, Agent, or Firm* — Ralph E. Smith

(57) ABSTRACT

A cam washer for a vehicle suspension system includes a point of rotation about which the washer is configured to rotate, and an outer surface profile where any point along the outer surface profile is configured to provide a friction angle less than a predetermined value to prevent the cam washer bolt from rotating under a load acting on the outer surface profile, the outer surface profile being a function of: i) a shortest distance from the point of rotation to the outer surface profile, ii) a longest distance from the point of rotation to the outer surface profile, iii) a position angle of the outer surface profile, and iv) a coefficient of friction of a material of the washer.

12 Claims, 4 Drawing Sheets

(56) References Cited

U.S. PATENT DOCUMENTS

| | | | |
|---|---|---|---|
| 8,944,447 B2* | 2/2015 | Khoury | B60B 35/004 |
| | | | 280/86.75 |
| 2002/0039522 A1* | 4/2002 | Hartmann | F16B 39/24 |
| | | | 411/161 |
| 2004/0094924 A1 | 5/2004 | Jones et al. | |
| 2007/0006444 A1* | 1/2007 | Makimae | F16B 5/02 |
| | | | 29/525.01 |
| 2013/0289628 A1 | 10/2013 | Fritzinger | |
| 2014/0029884 A1* | 1/2014 | Toyama | B62D 5/0409 |
| | | | 384/490 |
| 2014/0140786 A1* | 5/2014 | McKinlay | F16B 39/24 |
| | | | 411/147 |
| 2015/0219143 A1* | 8/2015 | Chalandon | F16B 2/005 |
| | | | 411/209 |
| 2017/0184144 A1* | 6/2017 | Lee | F16B 39/24 |

* cited by examiner

SELF-LOCKING CAM WASHER

FIELD

The present application relates generally to cam washer bolts for adjusting vehicle alignment and, more particularly, to a cam washer surface profile to prevent inadvertent rotation of cam washer bolts.

BACKGROUND

Cam washer bolts are typically utilized to adjust toe angle and camber angle of a vehicle alignment. Unintentional loading on the cam washer surface profile may cause the cam washer bolt to rotate, thereby causing potential misalignment that may result in accelerated vehicle tire wear. While such conventional cam washer bolts work well for their intended purpose, it is desirable to provide an improved cam washer bolt.

SUMMARY

According to an example aspect of the invention, a cam washer bolt for a vehicle suspension system is provided. In one exemplary implementation, the cam washer bolt includes a head, a stem, and a cam washer. The cam washer includes a point of rotation about which the washer is configured to rotate, and an outer surface profile where any point along the outer surface profile is configured to provide a friction angle less than a predetermined value to prevent the cam washer bolt from rotating under a load acting on the outer surface profile, the outer surface profile being a function of: i) a shortest distance from the point of rotation to the outer surface profile, ii) a longest distance from the point of rotation to the outer surface profile, iii) a position angle of the outer surface profile, and iv) a coefficient of friction of a material of the washer.

In addition to the foregoing, the cam washer outer surface profile is, in one exemplary implementation, defined by the equation:

$$\begin{cases} x = A \cdot \cos\theta \cdot B^{\mu\theta} \\ y = A \cdot \sin\theta \cdot B^{\mu\theta} \end{cases};$$

wherein A is the shortest distance from the point of rotation to the outer surface profile, B is a variable that is determined by the longest distance from the point of rotation to the outer surface profile, θ is the position angle of the outer surface profile, and μ is the coefficient of friction of a material of the washer. Any point along the outer surface profile is configured to provide a friction angle less than a predetermined value to prevent the washer from rotation under a load acting on the outer surface profile.

In addition to the foregoing, the described cam washer bolt may include one or more of the following features: wherein A is between 11.0 mm and 11.5 mm; wherein A is 11.3 mm; and wherein μ is 0.15.

According to another example aspect of the invention, a vehicle suspension system is provided. In one exemplary implementation, the vehicle suspension system includes a cradle, a knuckle, a link coupled between the cradle and the knuckle, wherein linear movement of the link causes angular adjustment of a wheel of the vehicle, and a cam washer bolt configured to couple the link to the cradle. Angular rotation of the cam washer bolt causes the linear movement of the link. The cam washer bolt includes a head, a stem, and a cam washer. The cam washer includes a point of rotation about which the washer is configured to rotate, and an outer surface profile where any point along the outer surface profile is configured to provide a friction angle less than a predetermined value to prevent the cam washer bolt from rotating under a load acting on the outer surface profile, the outer surface profile being a function of: i) a shortest distance from the point of rotation to the outer surface profile, ii) a longest distance from the point of rotation to the outer surface profile, iii) a position angle of the outer surface profile, and iv) a coefficient of friction of a material of the washer.

In addition to the foregoing, the outer surface profile is, in one exemplary implementation, defined by the equation:

$$\begin{cases} x = A \cdot \cos\theta \cdot B^{\mu\theta} \\ y = A \cdot \sin\theta \cdot B^{\mu\theta} \end{cases};$$

where A is the shortest distance from the point of rotation to the outer surface profile, B is a variable that is determined by the longest distance from the point of rotation to the outer surface profile, θ is the position angle of the outer surface profile, and μ is the coefficient of friction of a material of the washer. Any point along the outer surface profile is configured to provide a friction angle less than a predetermined value to prevent the cam washer bolt from rotation under a load acting on the outer surface profile.

According to yet another aspect of the invention, a cam washer bolt for a vehicle suspension system is provided. The cam washer bolt includes a head, a stem, and a washer bolt. The washer bolt includes a point of rotation about which the washer is configured to rotate, and an outer surface profile defined by the equation:

$$\begin{cases} x = A \cdot \cos\theta \cdot e^{\mu\theta} \\ y = A \cdot \sin\theta \cdot e^{\mu\theta} \end{cases}$$

wherein A is the shortest distance from the point of rotation to the outer surface profile, θ is a position angle of the outer surface profile, and μ is the coefficient of friction of a material of the washer. Any point along the outer surface profile is configured to provide a friction angle less than a predetermined value to prevent the washer from rotation under a load acting on the outer surface profile.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

The present application is directed to a cam washer surface profile having a locking angle or friction angle less than a predetermined value, at any point of the surface profile, to prevent the cam washer from rotation under loading. If the curve of the surface profile has a friction angle less than the predetermined value, the cam washer will not rotate, thereby facilitating preventing misalignment of the vehicle wheels. Further, it will be appreciated that the surface profile described herein is not limited to a cam washer and may be utilized for various load-receiving surfaces.

Figure 1:
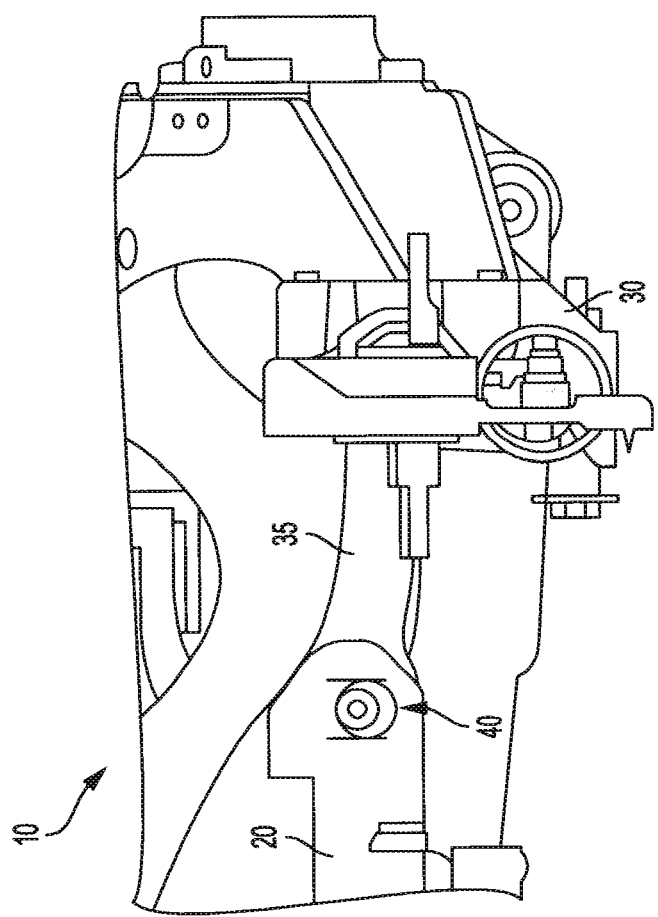
FIG. 1 is a rear view of a prior art vehicle alignment system.

With initial reference to FIG. 1, a prior art vehicle suspension system is illustrated and generally identified at reference numeral 10. The vehicle suspension system 10 generally includes a cradle 20, a knuckle 30, and a toe link 35 coupled therebetween. A cam washer bolt 40 couples one end of the toe link 35 to the cradle 20.

Figure 2:
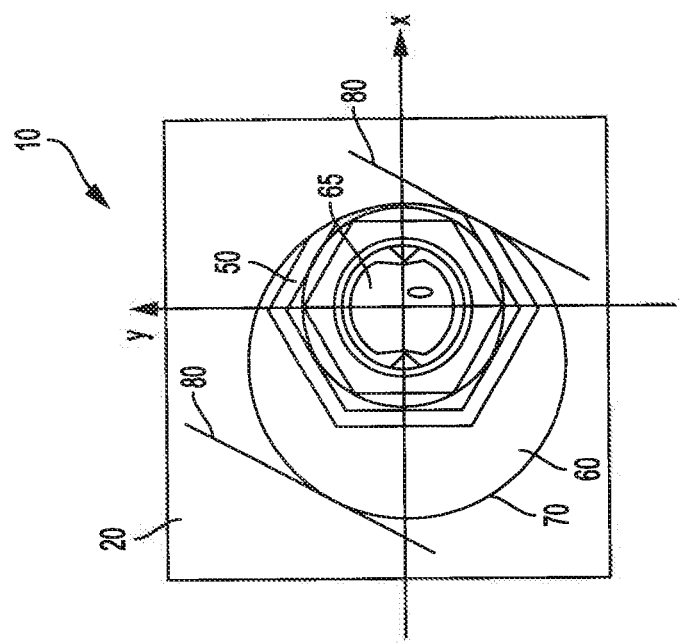
FIG. 2 is an enlarged view of an example prior art cam washer bolt shown in FIG. 1.

With further reference to FIG. 2, cam washer bolt 40 includes a head 50, a cam washer 60, and a stem 65. In one example, head 50 and stem 65 are integrally formed, and stem 65 is inserted through an aperture (not shown) formed in cam washer 60 until head 50 is disposed against cam washer 60. Stem 65 is threaded and configured to receive a nut (not shown).

Figure 4:
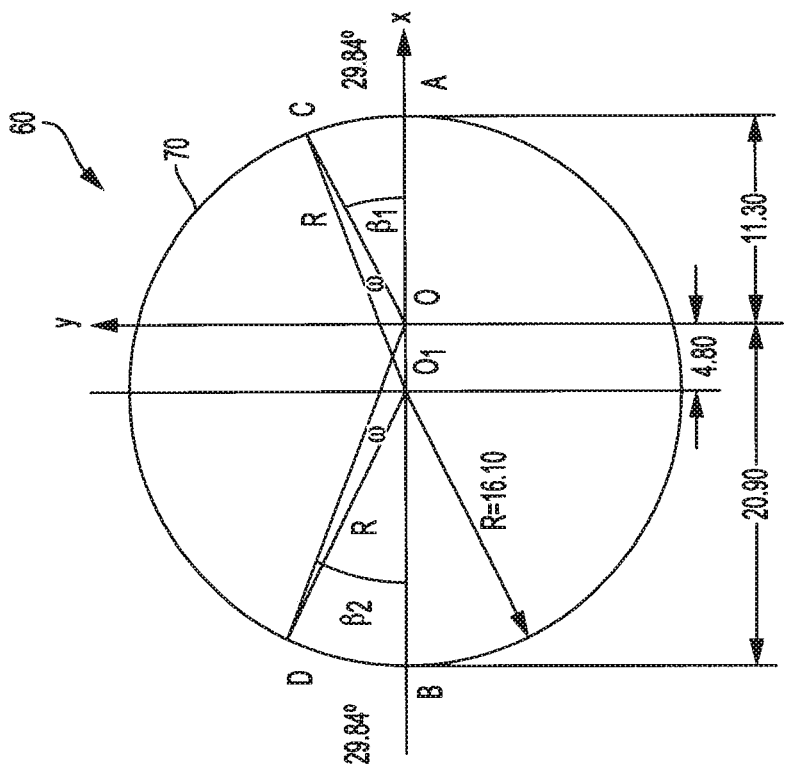
FIG. 4 is a schematic illustration of the cam washer shown in FIG. 3.
Figure 3:
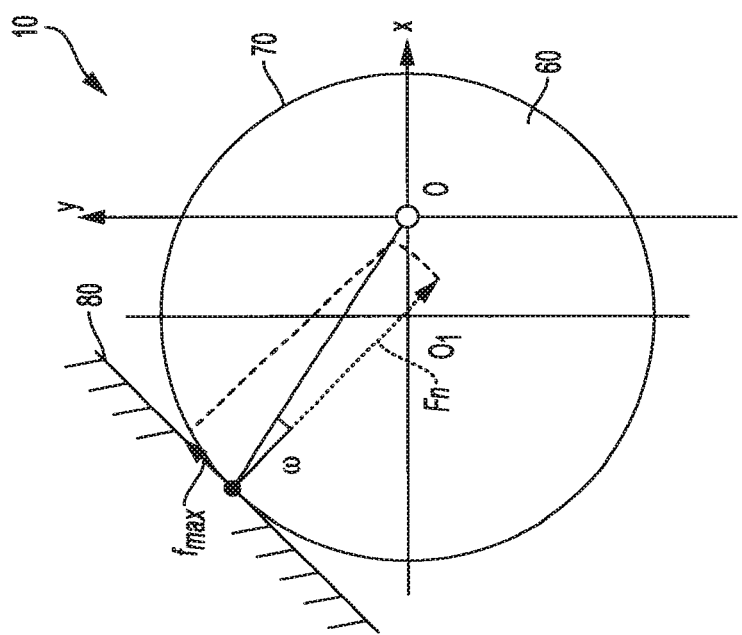
FIG. 3 is a schematic illustration of a cam washer of the cam washer bolt shown in FIG. 2.

Cam washer 60 defines an outer surface profile 70, which in the example illustration, is circular. However, a center 'O' of the bolt head is offset from a center 'O1' of the cam washer 60, as also shown in FIGS. 3 and 4. As cam washer bolt 40 is rotated, a portion of the outer surface profile 70 acts against a lance 80 of the cradle 20, which moves the toe link 35 to adjust a toe angle of a vehicle wheel (not shown). Cam washer bolt 40 may similarly be used with a spring link (not shown) to adjust a camber angle of the vehicle wheel.

With continued reference to FIG. 3, the cam washer outer surface profile 70 can be loaded by lance 80, which can cause unintended rotation of cam washer bolt 40, and thus unintended adjustment of the vehicle wheel alignment. However, loading at only certain points along the outer surface profile 70 cause rotation of cam washer bolt 40. More specifically, only when the moment generated by force 'Fn' on the outer surface profile 70 exceeds the moment generated by the friction '$f_{max}$' will the cam washer bolt 40 rotate.

As shown in FIG. 3, the cam washer outer surface profile 70 receives a compressive force 'Fn' in a direction normal to the surface of lance 80, and a friction force 'f' in a direction tangent to the point on the outer surface profile 70 receiving the compressive force 'Fn'. In the illustrated example, force 'Fn' creates a rotation of washer 60 in a counterclockwise direction, and friction force '$f_{max}$' creates a rotation of washer 60 in a clockwise direction. The maximum friction '$f_{max}$' where washer 60 is held from rotation is the product of force 'Fn' and the coefficient of friction 'μ'. Thus, if:

$f\mathrm{max} = \mu \cdot Fn$ then, $$\tan(\omega) = \frac{f\mathrm{max}}{Fn} = \frac{\mu \cdot Fn}{Fn} = \mu$$

By defining 'ω' as the friction angle where washer 60 begins to rotate under the compressive force 'Fn', $\omega = \tan^{-1}(\mu)$ Since the friction angle 'ω' is only dependent on the friction coefficient 'μ', if angle 'ω'>$\tan^{-1}(\mu)$, friction cannot prevent cam washer 60 from rotation. Accordingly, to prevent cam washer 60 from rotation by compressive force 'Fn', $\omega \leq \tan^{-1}(\mu)$.

With further reference to FIG. 4, an example prior art cam washer 60 is schematically illustrated having the following surface definition and dimensions: Point '$O_1$' is the center of circular washer 60; Point 'O' is the rotation center of cam washer bolt 40 (e.g., the center point of head 50); Radius 'R'=16.10 mm; the offset between point '$O_1$' and point 'O' is 4.8 mm; the minimum washer length $\overline{OA}$ is 11.30 mm; the maximum washer length '$\overline{OB}$' is 20.90 mm; the washer length adjustment is $\Delta = \overline{OA} - \overline{OB} = 9.60$ mm; the friction coefficient 'μ'=0.15 (e.g., for steel); and the friction angle $\omega = \tan^{-1}(0.15) = 8.53°$.

By sine law on $\Delta\ O_1OC$, $$\frac{R}{\sin(\pi - \beta 1)} = \frac{O_1O}{\sin \omega}$$

$$\sin \beta 1 = \frac{16.10}{4.80} \cdot \sin 8.53° = 0.4975$$

$$\beta 1 = 29.84° = \beta 2$$

Accordingly, for the illustrated cam washer 60, a locking or friction zone is defined between 0° and 29.84° and between 150.16° and 180°. If the contact point of compressive force 'Fn' is located outside of the friction zone, washer 60 will rotate. If the contact point of compressive force 'Fn' is located inside the friction zone, washer 60 will not rotate. As such the friction angle 'ω' is variable along the cam washer outer surface profile 70 on the circular design shown in FIGS. 2-4. Between points 'C' and 'D' (FIG. 4), friction angle 'ω' is greater than 8.53°, thus defining an unlocking zone.

Figure 5:
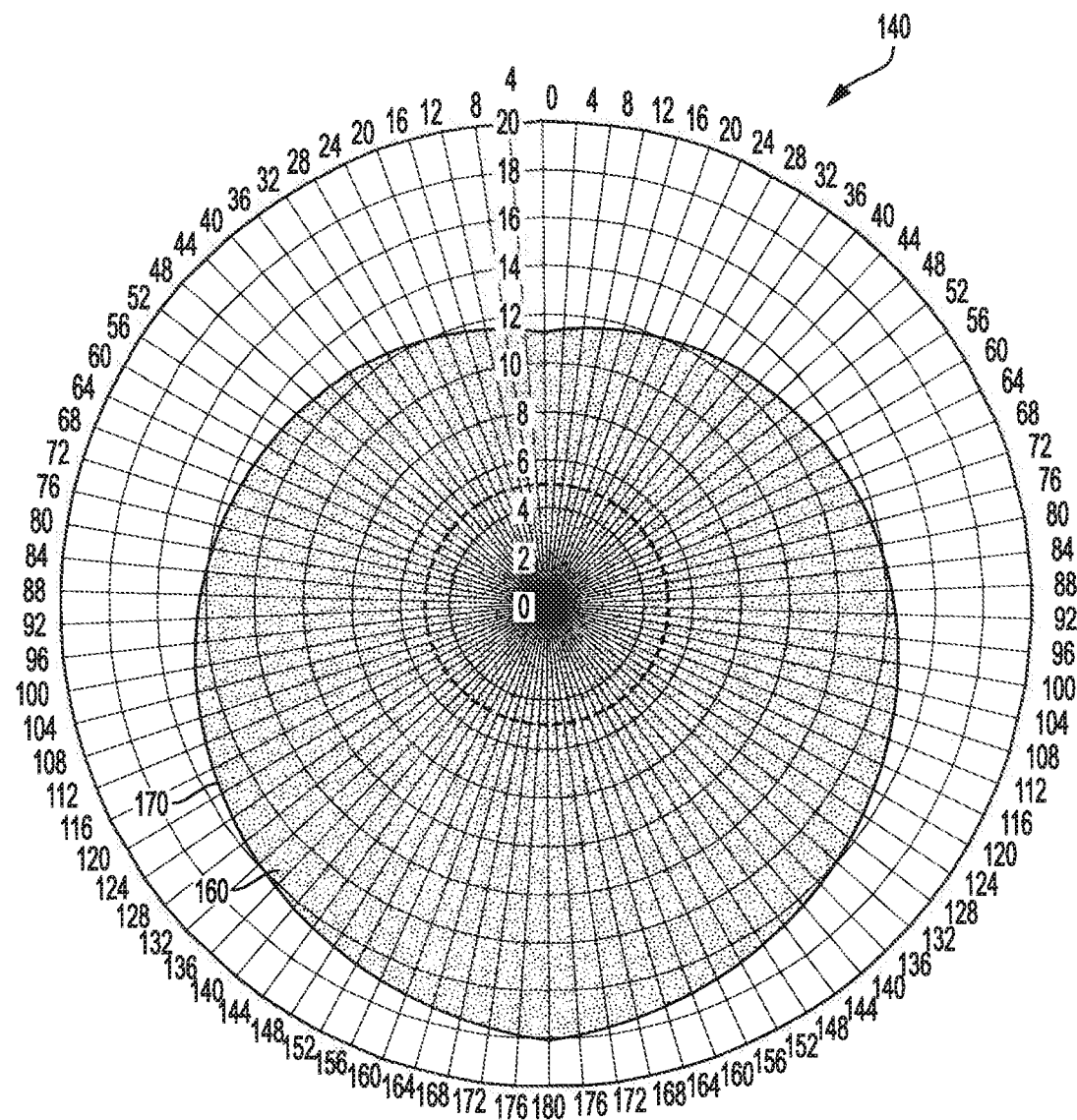
FIG. 5 is an illustration of one example cam washer surface profile, in accordance with the principles of the present disclosure.
Figure 6:
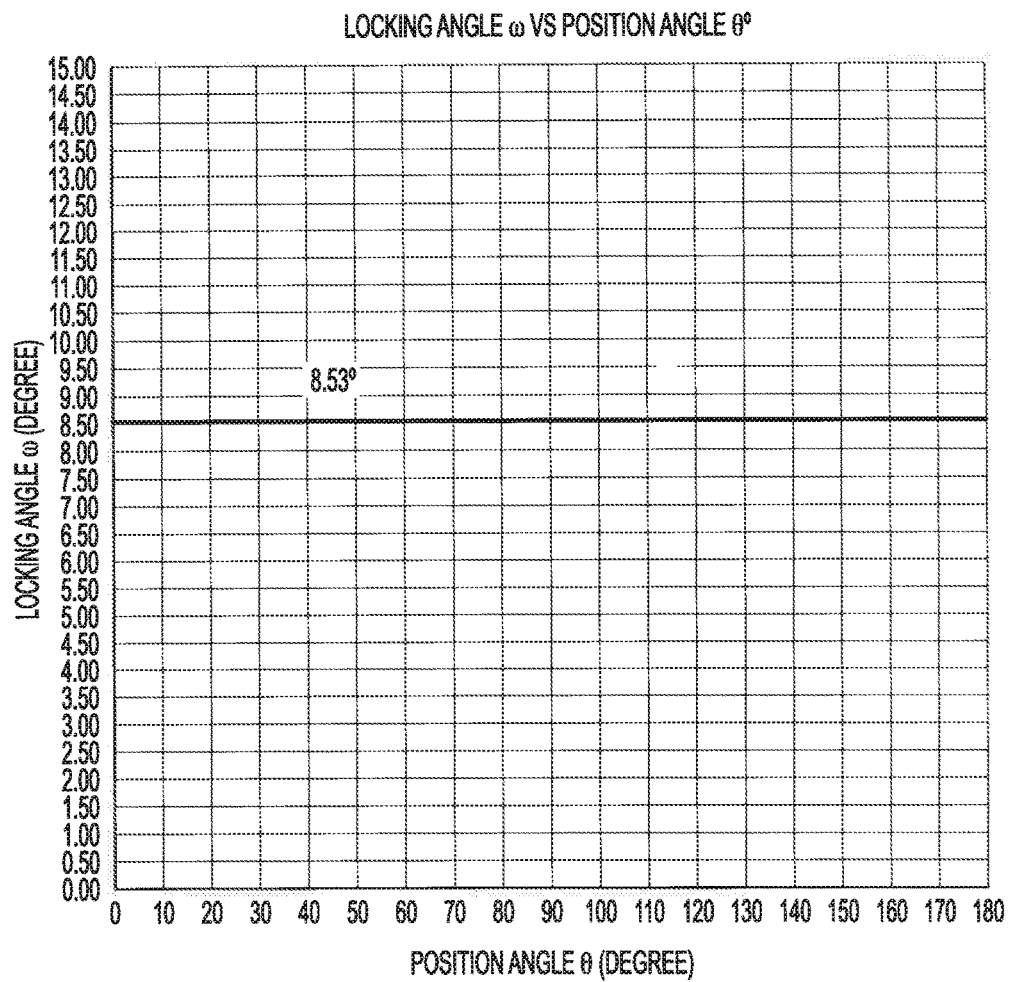
FIG. 6 is a graph illustrating a friction angle vs a position angle of the cam washer surface profile shown in FIG. 5, in accordance with the principles of the present disclosure.

Accordingly, with reference to FIGS. 5 and 6, the present disclosure develops a curve to provide a constant friction angle 'w' less than a predetermined value along any point of a cam washer 160 outer surface profile 170. The friction angle 'ω' will vary based on material and/or desired adjustment angle. Maintaining the friction angle 'ω' less than the predetermined value facilitates preventing unintended rotation of cam washer bolt 40 by load 'Fn' acting on the outer surface profile.

Accordingly, the outer surface profile 170 of washer 160 is defined by the equation:

$$\begin{cases} x = A \cdot \cos \theta \cdot B^{\mu \theta} \\ y = A \cdot \sin \theta \cdot B^{\mu \theta} \end{cases};$$

where A is the shortest distance from the point of rotation to the outer surface profile, B is a variable that is determined by the longest distance from the point of rotation to the outer surface profile, θ is a position angle of the outer surface profile, and μ is the coefficient of friction of a material of the washer, as discussed above.

In an alternative embodiment, the outer surface profile 170 of washer 160 is defined by the equation:

$$\begin{cases} x = A \cdot \cos\theta \cdot e^{\mu\theta} \\ y = A \cdot \sin\theta \cdot e^{\mu\theta} \end{cases}$$

where A is the shortest distance from the point of rotation to the outer surface profile, θ is a position angle of the outer surface profile, and μ is the coefficient of friction of a material of the washer, as discussed above.

In one example outer surface profile configuration, illustrated in FIG. 5, an outer surface profile 170 is determined for a cam washer bolt 140 having the alignment requirements of a maximum washer length (from the rotational center) of 20.90 mm, and a minimum washer length (from the rotational center) of 11.30 mm, which yields a cam washer design providing 20.90−11.30=9.60 mm of adjustment for the vehicle suspension system. Cam washer bolt 140 includes the same components as cam washer bolt 40, except for the replacement of the cam washer 60 by cam washer 160, and cam washer bolt 140 is applicable to vehicle suspension system 10 as described in FIG. 2. In one example implementation, it is desirable to have the minimum washer length at θ=0° and the maximum washer length at θ=180°, which provides a symmetrical cam washer 160. However, it will be appreciated that cam washer 160 can have an asymmetrical shape.

In one example, to determine the variable 'B' in the equations, the maximum washer length (e.g., 20.90 mm) is desired at θ=180°. Accordingly, in the equation x=A·cos θ·B^{μθ}, x=the maximum washer length (e.g., 20.90 mm), A=the minimum washer length (e.g., 11.30 mm), μ is the coefficient of friction of the washer material (e.g., 0.15 for steel), and θ=180° (e.g., π in radians). Accordingly, the equation becomes 20.9 mm=(11.30 mm)·1·B^{0.15π}, which yields B=3.689 for the desired maximum washer length at θ=180°. The value of the variable 'B' will thus necessarily change as the maximum washer length and/or θ is varied.

Accordingly, the illustrated cam washer 160 is configured to provide 9.60 mm of linear adjustment to the toe link 35. And this linear adjustment is provided over a 180° turn of the outer surface profile 170, which provides a symmetrical cam washer 160. As shown in FIG. 6, the shape of cam washer 160 maintains a steady friction angle 'ω' throughout the entire position angle 'θ' of outer surface profile 170, thereby preventing inadvertent rotation of cam washer bolt by force 'Fn' at any point on surface profile 170.

However, the outer surface profile can provide various linear adjustments by varying the desired maximum washer length, θ, and/or or 'B'. For example, if a linear adjustment less than 9.60 mm is desired, 'B' can be decreased, which will necessarily change the shape of cam washer 160 and the outer surface profile 170. Similarly, if a linear adjustment greater than 9.60 mm is desired, 'B' can be increased, which will also change the shape of cam washer 160 and the outer surface profile 170.

Regardless of shape, utilizing the given equations provides a cam washer outer surface profile configured to maintain a friction angle less than a desired or predetermined friction angle at any point the outer surface profile. Maintaining this friction angle along any point of the cam washer outer surface profile facilitates preventing the cam washer from unintentional rotation due to a compressive force acting on the cam washer via an operably associated link, such as a toe link or spring link. Accordingly, preventing unintentional rotation of the cam washer bolt facilitates preventing misalignment of the vehicle wheels and accelerated or uneven wear thereof.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A cam washer bolt for a vehicle suspension system, the cam washer bolt comprising:
   a head;
   a stem; and
   a non-circular cam washer configured to adjust a toe angle of a vehicle wheel, the cam washer including:
      a point of rotation about which the washer is configured to rotate, and
      an outer surface profile where any point along the outer surface profile is configured to provide a friction angle less than a predetermined value to prevent the cam washer bolt from rotating under a load acting on the outer surface profile, the outer surface profile being a function of: i) a shortest distance from the point of rotation to the outer surface profile, ii) a longest distance from the point of rotation to the outer surface profile, iii) a position angle of the outer surface profile, and iv) a coefficient of friction of a material of the washer.

2. The cam washer bolt of claim 1, wherein the outer surface profile is defined by the equation:

$$\begin{cases} x = A \cdot \cos\theta \cdot B^{\mu\theta} \\ y = A \cdot \sin\theta \cdot B^{\mu\theta} \end{cases};$$

wherein A is the shortest distance from the point of rotation to the outer surface profile, B is a variable that is determined by the longest distance from the point of rotation to the outer surface profile, A is the position angle of the outer surface profile, and μ is the coefficient of friction of a material of the washer.

3. The cam washer bolt of claim 2, wherein A is between 11.0 mm and 11.5 mm.

4. The cam washer bolt of claim 3, wherein A is 11.3 mm.

5. The cam washer bolt of claim 3, wherein p is 0.15.

6. The cam washer bolt of claim 1, wherein the point of rotation is an eccentric point of rotation, and wherein the outer surface profile is non-circular.

7. A vehicle suspension system comprising:
   a cradle and a knuckle;
   a link coupled between the cradle and the knuckle, wherein linear movement of the link causes angular adjustment of a wheel of the vehicle; and
   a cam washer bolt configured to couple the link to the cradle, wherein angular rotation of the cam washer bolt causes the linear movement of the link, wherein the cam washer bolt comprises:

a head and a stem; and a non-circular cam washer configured to adjust a toe angle of a vehicle wheel, the cam washer including:

a point of rotation about which the washer is configured to rotate, and an outer surface profile where any point along the outer surface profile is configured to provide a friction angle less than a predetermined value to prevent the cam washer bolt from rotating under a load acting on the outer surface profile, the outer surface profile being a function of: i) a shortest distance from the point of rotation to the outer surface profile, ii) a longest distance from the point of rotation to the outer surface profile, iii) a position angle of the outer surface profile, and iv) a coefficient of friction of a material of the washer.

8. The vehicle suspension system of claim 7, wherein the outer surface profile is defined the equation:

$$\begin{cases} x = A \cdot \cos\theta \cdot B^{\mu\theta} \\ y = A \cdot \sin\theta \cdot B^{\mu\theta} \end{cases};$$

wherein A is the shortest distance from the point of rotation to the outer surface profile, B is a variable that is determined by the longest distance from the point of rotation to the outer surface profile, $\theta$ is the position angle of the outer surface profile, and $\mu$ is the coefficient of friction of a material of the washer.

9. The vehicle suspension system of claim 8, wherein A is between 11.0 mm and 11.5 mm.

10. The vehicle suspension system of claim 9, wherein A is 11.3 mm.

11. The vehicle suspension system of claim 9, wherein $\mu$ is 0.15.

12. The vehicle suspension system of claim 7, wherein the outer surface profile is non-circular and an outer perimeter of the non-circular cam washer, and wherein the point of rotation is an eccentric point of rotation.

* * * * *